Nov. 19, 1957  O. B. HARMES ET AL  2,813,694
IRRIGATION CONTROL VALVE
Filed July 9, 1954
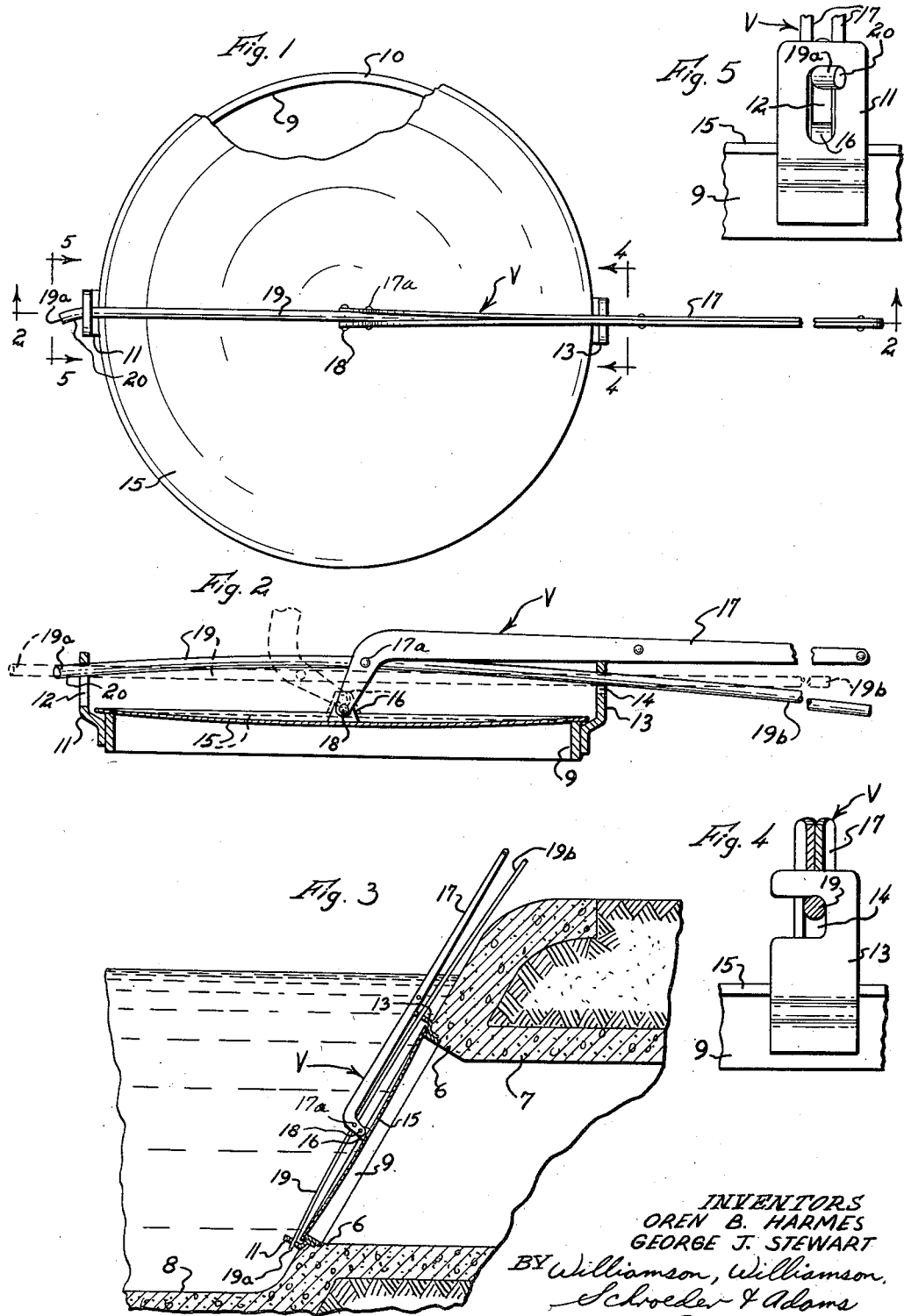
INVENTORS
OREN B. HARMES
GEORGE J. STEWART
BY Williamson, Williamson,
Schroeder & Adams
ATTORNEYS United States Patent Office 2,813,694
Patented Nov. 19, 1957

2,813,694

IRRIGATION CONTROL VALVE

Oren B. Harmes, Algona, Iowa, and George J. Stewart, Phoenix, Ariz., assignors to Livingston Tool Co., Algona, Iowa, a partnership Application July 9, 1954, Serial No. 442,388

1 Claim. (Cl. 251—89)

This invention relates to irrigation control valves. More particularly, it relates to improved valves adapted to be positioned within an irrigation ditch for controlling the flow of water therethrough.

It is a general object of our invention to provide a novel and improved irrigation valve of inexpensive and simple construction and operation.

A more specific object is to provide a novel and improved irrigation valve which can be manufactured inexpensively and will operate in a more efficient manner.

A still more specific object is to provide an irrigation valve which can more readily and easily be moved into the necessary position preparatory to locking the same in closed position.

Another object is to provide a novel irrigation valve which will more efficiently eliminate leaking at the edges thereof.

Another object is to provide a novel irrigation valve constructed to apply the pressure at the center of the valve when the latter is in closed position and to thus more efficiently seal off the water at the edges of the valve at all points about the circumference thereof.

Another object is to provide a novel and improved irrigation valve having a more simple and efficient locking and unlocking means than heretofore known on irrigation valves.

Another object is to provide an irrigation valve constructed so that it may be moved into position preparatory to locking the same without applying inward pressure to the valve disc and to thereby eliminate the possibility of the edge of the valve disc engaging the edge of the valve seat ring member.

These and other objects and advantages of our invention will more fully appear from the following description made in connection with the accompanying drawings wherein like reference characters refer to the same parts throughout the several views and in which:

Figure 1 is a plan view of one embodiment of our invention;

Figure 2 is a vertical sectional view taken along line 2—2 of Figure 1;

Figure 3 is a vertical sectional view of an irrigation ditch showing one of our valves in place and in closed position;

Figure 4 is a fragmentary sectional view taken along line 4—4 of Figure 1; and

Figure 5 is a fragmentary end elevation view taken along line 5—5 of Figure 1.

One embodiment of our invention, which is disclosed as the valve indicated generally as V, is best shown in position for use in Figure 3. As is shown, it is suitably anchored or embedded in the wall-defining portions 6 of the discharge pipe 7 which empties into the irrigation ditch 8. As best shown in Figure 2, our valve member V may include in combination a valve seat ring member 9 which is circular in shape and has a valve seat 10 at its outer end. Secured to the outer surface of the valve seat ring member 9 at the bottom thereof, as shown in Figure 3, is a bracket member 11. This bracket member 11 has an elongated slot 12 formed therethrough. A second and oppositely disposed bracket member 13 is mounted on the outer surface of the valve seat ring member 9 at the top of that member, as best shown in Figures 2 and 3. This bracket member 13 has a slit 14 extending inwardly from the side portion thereof, as best shown in Figure 4. As shown in Figures 2 and 3, each of the oppositely disposed bracket members 11 and 13 extends outwardly beyond the valve seat 10.

The structure hereinbefore defined is essentially old but has been described to show its use in combination with our novel irrigation valve structure. This includes a valve disc 15 which is adapted to engage the valve seat 10 to close the same, as best shown in Figure 2. Mounted on the outer surface of the valve disc 15 and extending outwardly therefrom is a pair of upstanding mounting ears 16 which are spaced a small distance from each other and pivotally support or mount a camming lever 17 by means of a pivot pin 18 which extends through the ears 16. As best shown in Figure 2, this camming lever 17 is angulated at its inner end, the inner end portion extending at an angle approaching, but somewhat less than, 90° from the length of the lever. The outer end portion of the camming lever serves as a handle portion or grip.

The camming lever 17 is pivotally connected as at 17a to a cross member 19 which is preferably in the form of a rod. This cross member 19 extends diametrically of the valve disc 15 and beyond the circumferential portions thereof so that the lower end portion 19a may be passed through the slot 12 of the bracket member 11 and so that the upper end portion 19b may extend upwardly a substantial distance above the valve seat ring member so that it may be readily grasped by the user to facilitate the positioning of the unit in the desired place. A hook member 20 is formed at the extreme lower end of the rod 19 and this hook member is bent in the plane of the disc 15. It should be noted that the point of pivotal connection between the camming lever 17 and the cross member 19 is a distance from the valve disc 15 greater than the distance between the valve disc 15 and a line between the slot 12 and the slit 14. By making this distance greater than the distance between such a line and the valve disc, a positive camming action is provided against the valve disc 15 by swinging the camming lever 17 between the solid and broken line positions shown in Figure 2. The solid line position shown in Figure 2 is the locked position of the clamping mechanism and the broken line position shown in Figure 2 is the unlocked position of that mechanism. The cross member 19, the camming lever 17 and the bracket members 11 and 13 may be considered as a clamping mechanism for the purpose of clamping the valve disc 15 tightly against the valve seat 10 to prevent leakage of water therethrough.

To utilize our irrigation valve, the hook member 20 is inserted in the slot 12 and the upper end portion of the cross member 19 is then moved sidewise into the slot 14. This brings the valve disc 15 directly in front of the discharge opening of the discharge pipe 7 but does not close off the discharge outlet. The camming lever 17 must, during the above positioning, be in unlocked position so as to extend outwardly from the valve disc. Once the cross member 19 has been positioned as described, the camming lever 17 may be swung to the full line position shown in Figure 2 whereupon the cross member 19 will be cammed slightly outwardly and the valve disc 15 will be cammed strongly inwardly so as to firmly engage the valve seat 10 at all points therearound and to close off the discharge outlet. It will be readily seen, through reference to Figure 2, that as the camming lever 17 is moved beyond an over-center position, the disc 15 will automatically be locked in locked position by the over-center camming action. When it is desired to unlock the irrigation valve, it is a simple matter to throw the camming lever 17 outwardly toward the broken line position shown in Figure 2, whereupon the valve disc will be quickly and easily released from the valve seat.

When desired, the irrigation valve shown may be utilized to partially close off the discharge opening of the discharge pipe 7 so as to restrict the flow of water therethrough but not cut it off entirely. The hook member 20 permits the cross member 19 to be swung laterally so that the valve disc will only partially obstruct the discharge opening of the discharge pipe 7. In this manner, a restricted flow of water may be permitted to enter the irrigation ditch.

It should be noted that our irrigation ditch valve has a number of distinct advantages. To begin with, the device is extremely simple to utilize and it can be manufactured simply and quite inexpensively. A more important feature, however, is that the pressure is applied to the central portion of the valve disc so that equal pressure is exerted at all points around the valve seat 10 and, therefore, substantially all leakage is eliminated. Irrigation valves previously known generally position the pressure at various points around the circumferential portions of the valve disc and the portions between these points will have insufficient pressure applied to the disc to prevent leakage between the disc and the valve seat. By applying the pressure at the central portion of our disc and by using a camming action, we are assured of a continuous and even pressure being applied at all points around the valve seat 10.

Another distinct advantage of our irrigation valve is that it is a relatively easy matter to move the valve disc 15 to a position preparatory to closing off the same. It should be noted that our valve disc 15 may be swung to a position directly opposite the discharge opening of the discharge pipe 7 preparatory to locking the irrigation valve and sealing off the discharge pipe without any pressure being applied to the valve disc. Most irrigation valves, in order to be moved to closed position, must have pressure applied to the valve disc while the disc is being slid laterally to a position across the opening of the discharge pipe. When this is done, the edge of the valve disc frequently engages the edge of the valve seat ring member, causing deformation of the valve disc and, subsequently, leakage at such points. In addition, it is a very tedious and exasperating operation to position the valve disc properly across the discharge opening while simultaneously applying pressure to the valve disc. In the use of our irrigation valve, the valve disc may be quickly and easily positioned directly in front of the discharge opening and then may be very easily swung to locked position.

It will be noted that the cross member 19 shifts longitudinally during the locking or unlocking action of our irrigation valve. This movement, of course, is diametrically of the valve disc 15 because the camming lever 17 is pivotally mounted at the central portion of the valve disc. The longitudinally shiftable cross member 19 enables us to utilize an over-center cam action clamping mechanism on the valve disc 15 and thereby attain the desired advantages outlined above.

It should also be noted that the locking and unlocking operation of our irrigation valve is substantially more simple than those previously utilized in connection with irrigation ditches. It can be readily appreciated, through reference to Figures 2 and 3, that it is a simple matter to position and lock or unlock our irrigation valve as desired.

It will, of course, be understood that various changes may be made in the form, detail, arrangement and proportion of the parts without departing from the scope of our invention.

What is claimed is:

In an irrigation valve, a valve seat ring member, a valve seat on the outer end of said ring member, a valve disc adapted to engage said valve seat, a bracket carried by said ring member and extending outwardly beyond said valve seat, a second bracket carried by said ring member opposite said first mentioned bracket and also extending outwardly beyond said valve seat, a cross member extending between said brackets and engaged thereby, said cross member being shiftable longitudinally between said brackets and an over-center camming lever pivotally connected to said cross member and to the center of said disc, said lever being movable from unlocked position to locked position by swinging said lever longitudinally of said cross member and thereby causing the latter to shift longitudinally therewith and to be cammed upwardly whereby said disc will be urged inwardly against said valve seat.

References Cited in the file of this patent

UNITED STATES PATENTS

| 894,240 | Taylor | July 28, 1908 |
| 2,001,094 | Cuttle | May 14, 1935 |
| 2,324,256 | Brown | July 13, 1943 |
| 2,628,056 | Fuller | Feb. 10, 1953 |
| 2,688,461 | Simpson | Sept. 7, 1954 |
| 2,734,656 | Schonfeld | Feb. 14, 1956 |

FOREIGN PATENTS

| 513,355 | France | Feb. 14, 1921 |
| 682,765 | France | June 2, 1930 |